United States Patent
Yarabolu et al.

(10) Patent No.: US 12,259,869 B2
(45) Date of Patent: Mar. 25, 2025

(54) SYSTEM AND METHODS FOR DYNAMIC VISUAL GRAPH STRUCTURE PROVIDING MULTI-STREAM DATA INTEGRITY AND ANALYSIS

(71) Applicant: BANK OF AMERICA CORPORATION, Charlotte, NC (US)

(72) Inventors: Vijay Kumar Yarabolu, Telangana (IN); Gowthaman Sundararaj, Tamilnadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 5 days.

(21) Appl. No.: 18/110,235

(22) Filed: Feb. 15, 2023

(65) Prior Publication Data
US 2024/0273083 A1   Aug. 15, 2024

(51) Int. Cl.
*G06F 16/20* (2019.01)
*G06F 16/23* (2019.01)
*H04L 67/14* (2022.01)

(52) U.S. Cl.
CPC .......... *G06F 16/2365* (2019.01); *H04L 67/14* (2013.01)

(58) Field of Classification Search
CPC .................................................. G06F 16/2365
See application file for complete search history.

(56) References Cited

U.S. PATENT DOCUMENTS

| | | |
|---|---|---|
| 6,609,123 B1 | 8/2003 | Cazemier et al. |
| 7,493,313 B2 | 2/2009 | Kakivaya et al. |
| 7,890,518 B2 | 2/2011 | Aasman |
| 8,244,772 B2 | 8/2012 | Aasman et al. |
| 8,838,593 B2 | 9/2014 | Apanowicz et al. |
| 9,792,347 B2 | 10/2017 | Guo et al. |
| 9,858,280 B2 | 1/2018 | Lee et al. |
| 10,503,905 B1 * | 12/2019 | Misra ...................... G06F 21/64 |
| 10,740,396 B2 | 8/2020 | Aswani et al. |
| 10,769,142 B2 | 9/2020 | Chen |
| 10,885,026 B2 | 1/2021 | Das et al. |
| 11,023,774 B2 | 6/2021 | Nefedov |
| 11,086,848 B1 * | 8/2021 | Raman ................ G06F 16/2365 |
| 11,120,344 B2 | 9/2021 | Das et al. |
| 11,409,764 B2 | 8/2022 | Rehal |
| 11,461,294 B2 | 10/2022 | Soza |
| 11,461,320 B2 | 10/2022 | Das et al. |
| 2007/0219943 A1 | 9/2007 | Draughn |
| 2008/0140696 A1 | 6/2008 | Mathuria |
| 2010/0223268 A1 | 9/2010 | Papakonstantinou et al. |
| 2016/0057217 A1 * | 2/2016 | Beaverson .......... H04L 67/1087 707/827 |
| 2017/0235446 A1 | 8/2017 | Stolte et al. |
| 2020/0117737 A1 | 4/2020 | Gopalakrishnan et al. |

* cited by examiner

*Primary Examiner* — Kristopher Andersen
(74) *Attorney, Agent, or Firm* — Moore & Van Allen PLLC; Nicholas C. Russell

(57) ABSTRACT

Systems, computer program products, and methods are described herein for dynamic visual graph structure providing multi-stream data integrity and analysis. The present disclosure is configured to provide a reactive system aimed to trace the root cause of incidents and uncover potential gaps in security of an enterprise system. Maintaining accurate and meaningful information related to incidents is the key for success of data security protocols. The integrity of message data is kept intact for improved forensic investigation, as each database may keep varying information related to a single global session.

20 Claims, 4 Drawing Sheets

SYSTEM AND METHODS FOR DYNAMIC VISUAL GRAPH STRUCTURE PROVIDING MULTI-STREAM DATA INTEGRITY AND ANALYSIS

TECHNOLOGICAL FIELD

Example embodiments of the present disclosure relate to dynamic systems and methods for ensuring integrity of data across multiple databases containing related data or information in an entity structure.

BACKGROUND

Big data ingestion gathers data and brings it into a data processing system where it can be stored, analyzed, and accessed. Data processing systems can include data lakes, databases, and search engines. Typically, this data is unstructured, comes from multiple sources, and exists in diverse formats.

Applicant has identified a number of deficiencies and problems associated with ingestion of big data, and more particularly, maintaining the integrity of data across multiple databases, especially when data stored on multiple databases may contain different components from the same global data session. Additionally, purging of data that may be related to data security requires keeping accurate records that have inbuilt features for avoiding errant data deletion.

Keeping accurate and meaningful information related to various incidents is key for success of data security systems. The integrity of various messages should be kept intact for better investigation, as each database keeps different pieces or types of information. In addition, a need exists for an improved system which can track the interrelation of session data across disparate databases while preserving full integrity of the data record associated with a unique global data session identifier.

BRIEF SUMMARY

Systems, methods, and computer program products are provided for dynamic visual graph structures.

In one aspect, a system for dynamic visual graph structure providing multi-stream data integrity and analysis is presented. The system comprising: a processing device; a non-transitory storage device containing instructions when executed by the processing device, causes the processing device to perform the steps of: capture data ingestion information associated with an end-point device over a period of time; determine, using a machine learning (ML) subsystem, data ingestion pattern for the end-point device based on at least the data ingestion information; generate a query sequence for predictive extraction of data from a data lake based on at least the data ingestion pattern; trigger the predictive extraction of the data from the data lake based on at least the query sequence; and store the data in a application database associated with the end-point device in response to the predictive extraction.

In one aspect, a system for predictive generation of databases is presented, the system generally comprising: a processing device; a non-transitory storage device containing instructions when executed by the processing device, causes the processing device to perform the steps of: receive global session data from a streaming or batch data source; based on one or more data characteristics of the global session data, determine one or more impacted databases; generate knowledge graph metadata file for the global session data; assign a global session reference number, a unique graph key, and an integrity counter to the metadata file; generate a unique hash value based on the global session reference number, the unique graph key, and the integrity counter; and store data in one or more upstream, downstream, or analytics databases.

In some embodiments, the system is further configured to split the global session data into multiple data entries stored in multiple databases.

In some embodiments, the system is further configured to link the multiple data entries via a single global session identification number.

In some embodiments, the system is configured to: receive a purge request to delete one or more data entries of the global session data; execute the purge request by updating a change log; and verify integrity of the purge request.

In some embodiments, verifying the integrity of the purge request comprises accessing the knowledge graph metadata file for the global session data; and determining if an integrity counter for the one or more data entries is greater than zero.

In some embodiments, the system is configured to: the system is configured to rollback the purge request and restore the one or more data entries if the integrity counter for the one or more data entries is greater than zero.

In some embodiments, the system is configured to generate a request to verify importance of the one or more data entries if the integrity counter is greater than zero to determine if a rollback of data deletion is necessary.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1:
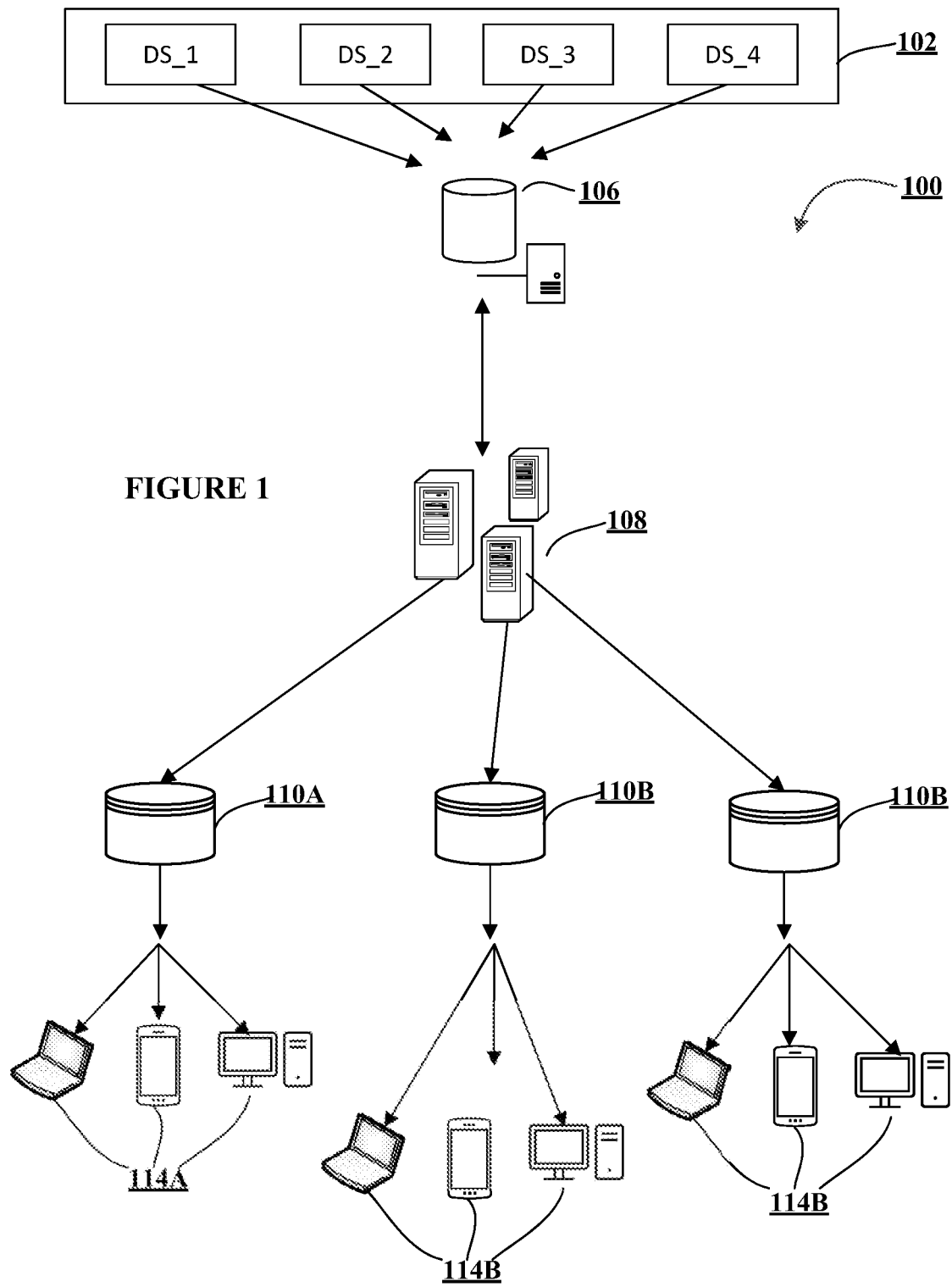

FIG. 1 illustrates technical components of an exemplary computing environment for dynamic visual graph structure providing multi-stream data integrity and analysis, in accordance with an embodiment of the disclosure.

Figure 2:
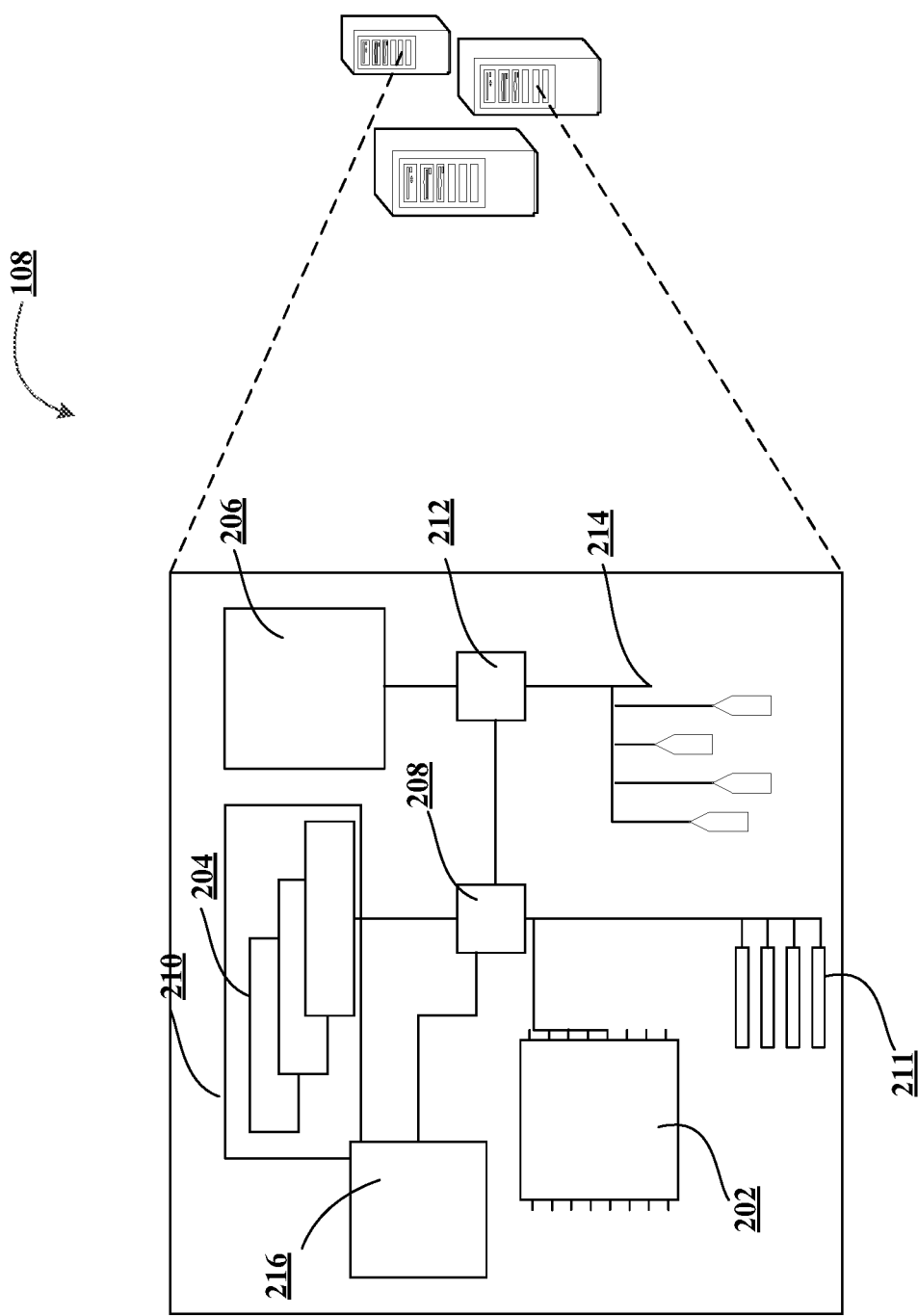

FIG. 2 illustrates an exemplary component-level structure of the system 108, in accordance with an embodiment of the disclosure.

Figure 3:
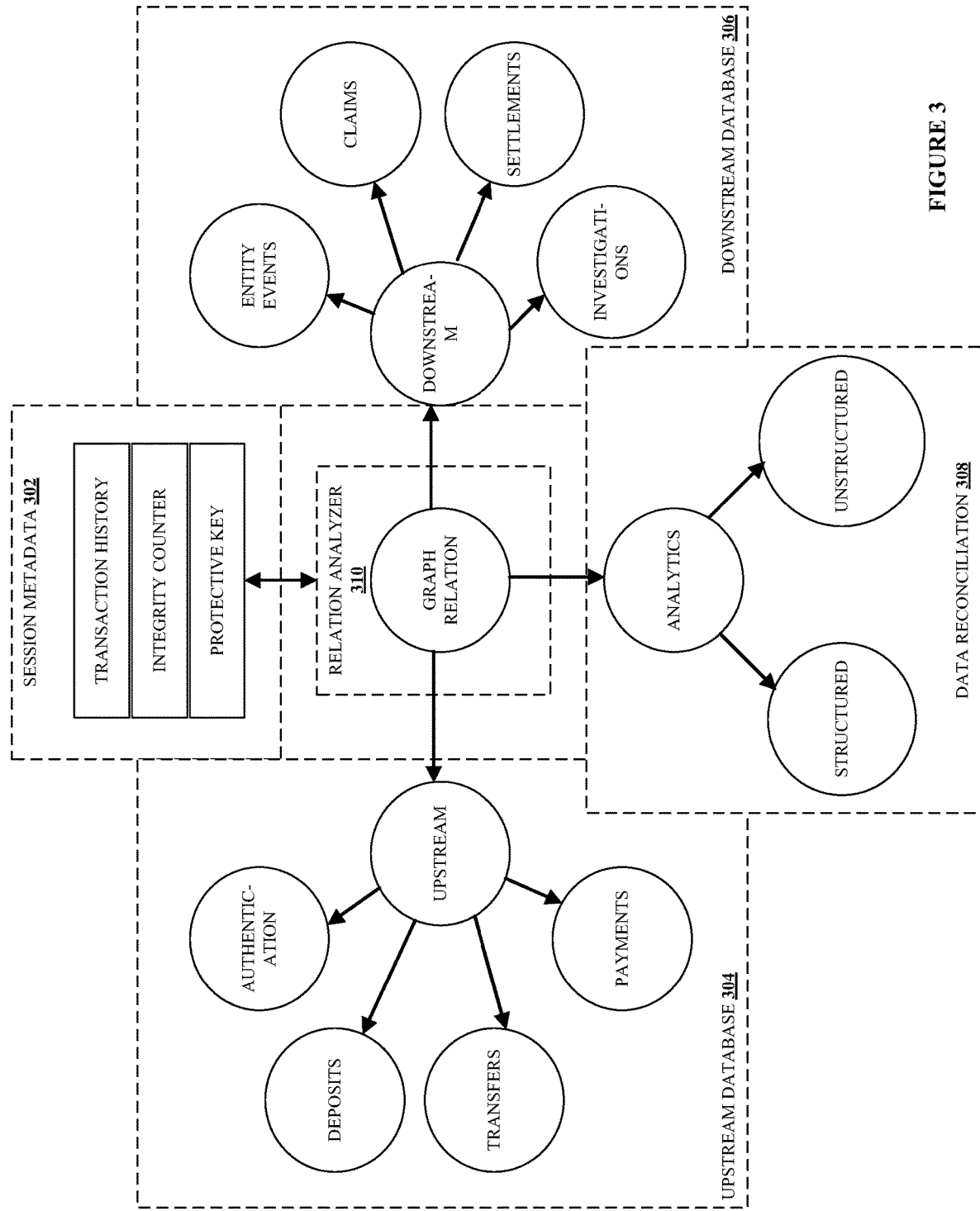

FIG. 3 illustrates an exemplary data flow, in accordance with an embodiment of the disclosure.

Figure 4:
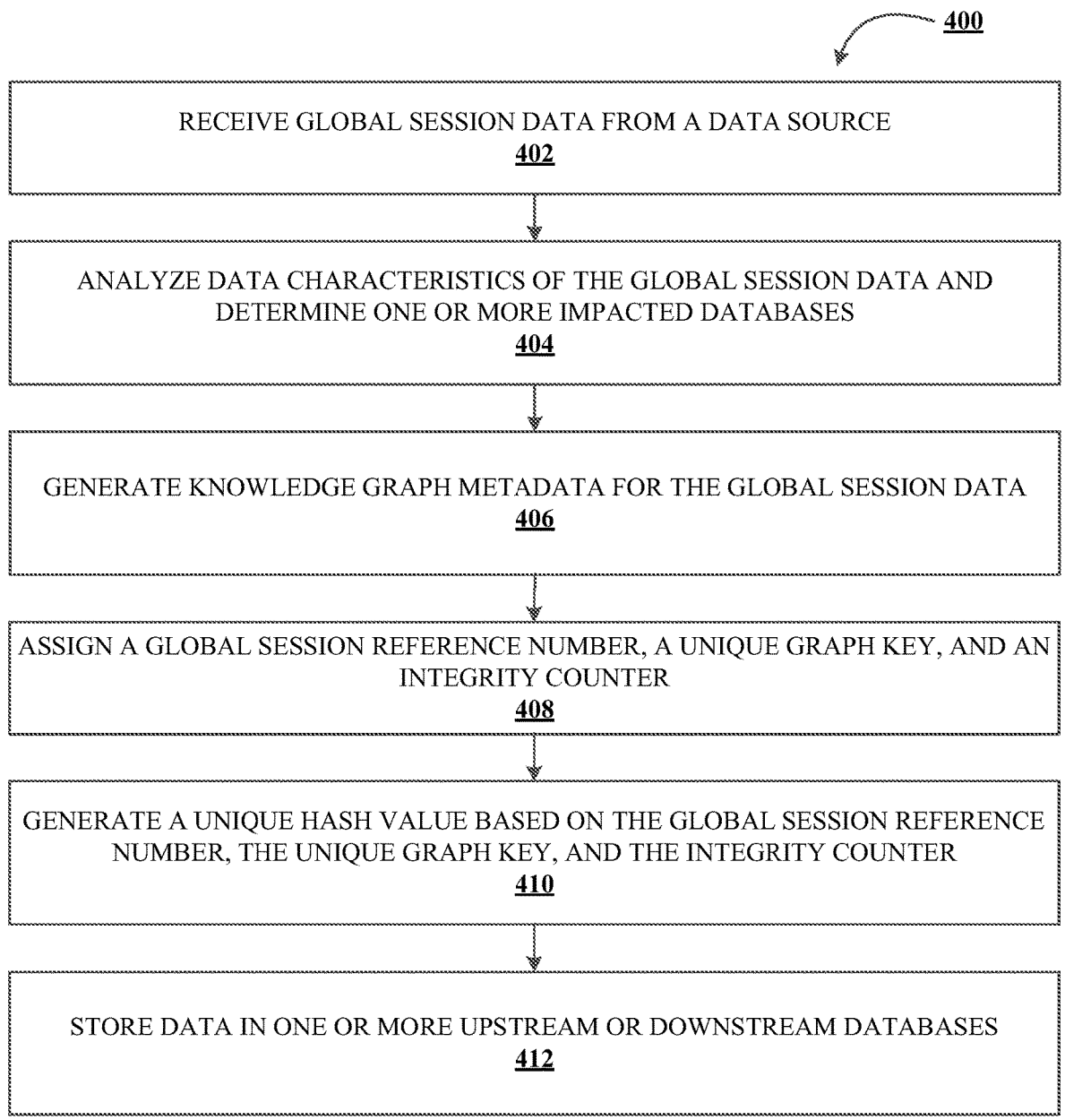

FIG. 4 illustrates a method for dynamic visual graph structure providing multi-stream data integrity and analysis, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

During operations, data requests from end-point devices are typically fulfilled by the data lake. This involves routing the data request through the fog server to retrieve the requisite data from the data lake to be stored in the corresponding application database. In time sensitive operations, such as ML training sequences, requiring each data request to be fulfilled by the data lake may cause latency issues in the request-response process. Such latency issues often have a cascading effect that affects the operations performed by the end-point device. By identifying specific data requirements for the end-point device using the data ingestion patterns, the present disclosure may be able to generate a query sequence to predictively retrieve the requisite data for the end-point device from the data lake preemptively and store the data in the application database for the fog server to access quickly. Therefore, in response to a request for data from the end-point device, the system may trigger a transmission of the data from the application database to the end-point device, thereby reducing a latency associated with otherwise extracting the data from the data lake. Accordingly, the query sequence may not only define the data required but also define a particular order in which the data is to be retrieved from the data lake. What is more, the present disclosure provides a technical solution to a technical problem. The technical solution described herein uses a rigorous, computerized process to perform specific tasks and/or activities that were not previously performed. In specific implementations, the technical solution bypasses a series of steps previously implemented, thus further conserving computing resources.

FIG. 1 illustrates technical components of an exemplary computing environment for predictive generation of application databases 100, in accordance with an embodiment of the disclosure. As shown in FIG. 1, the distributed computing environment 100 contemplated herein may include data sources DS_1, DS_2, DS_3, DS_4 102, a centralized cloud data center 104, a data lake 106, a system 108, application databases 110A, 110B, 110C, end-point devices 114A, 114B, and 114C. FIG. 1 illustrates only one example of an embodiment of the computing environment 100, and it will be appreciated that in other embodiments one or more of the systems, data centers, data lakes, application databases, devices, and/or servers may be combined into a single system, device, or server, or be made up of multiple systems, devices, or servers. Also, the computing environment 100 may include multiple systems, same or similar to system 108, with each system providing portions of the necessary operations (e.g., as a server bank, a group of blade servers, or a multi-processor system).

The data sources DS_1, DS_2, DS_3, DS_4 102 may refer to a primary location from where the data is gathered. In other words, data sources DS_1, DS_2, DS_3, DS_4 102 may include a database, a flat file, live measurements from physical devices, scraped web data, or any of the myriad static and streaming data services which abound across the computing environment and beyond (e.g., Internet). Data retrieved from the data sources DS_1, DS_2, DS_3, DS_4 102 may have varying file formats that defines the structure and encoding of the data stored therein and is identified by its file extension. However, some data sources DS_1, DS_2, DS_3, DS_4 102 generate data that is not in a format that can be directly used for processing. It is further understood that the data sources DS_1, DS_2, DS_3, DS_4 102 may be transmitted in two primary fashions; namely, streaming data and batch data. The data from each of the data sources DS_1, DS_2, DS_3, DS_4 102 is funneled into the data lake 106 for storage.

In some embodiments, the data lake 106 may receive the data from the data sources DS_1, DS_2, DS_3, DS_4 102 and implement initial data integration and processing steps needed to prepare the data for use. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other data processing steps as needed. In some other embodiments, the data lake 106 may receive the data from the data sources DS_1, DS_2, DS_3, DS_4 102 and store the data as is without implementing any additional data integration and processing steps. In further embodiments, the data lake 106 may implement pre-processing steps designed to prepare the data for integrity analysis and knowledge graph display. As further discussed with regard to FIG. 3, this may include tracking how the data is stored, accessed, or used, verifying the integrity of the data, and executing requests to update a catalog of data, purge data, or rollback implemented changes in some circumstances.

In large entities with varying lines of businesses, the data requirement for each line of business may be vastly different. Each line of business may be associated with a dedicated data lake (e.g., data lake 106), which provides data for operations specific to that line of business. Accordingly, the data lake 106 may be a data repository comprising object blobs or files, including raw copies of source system data, sensor data, social data and/or the like, and transformed data used for tasks such as reporting, visualization, advanced analytics, machine learning, and/or the like. As such, the data lake 106 may include structured data from relational databases (rows and columns), semi-structured data (CSV, logs, XML, JSON), unstructured data (emails, documents, PDFs) and binary data (images, audio, video). The data lake 106 may be configured to provide the necessary data to various application databases (e.g., application database 110A, 110B, 110C).

Each line of business in a large entity may have a number of project-lines that perform dedicated operations. Most of these operations require large amount of data. While each line of business may have a dedicated data lake (e.g., data lake 106), each project-line may have a dedicated application database (e.g., application database 110A) that stores data specific to operations performed by that project-line. As such, each data lake (e.g., data lake 106) may be configured to store and provide necessary data to each project-line. Accordingly, the data lake 106 may serve one or more application databases (e.g., application databases 110A, 110B, 110C), where each application database is dedicated to a project-line, application, or entity-related function (e.g., payments, transfers, authentication, malfeasance detection, deposits, claims, or the like). Additionally, it is understood that any of the application databases 110A, 110B, 110C may represent either structured or unstructured databases in terms of how data is stored and formatted. Each of the application databases 110A, 110B, 110C is tracked by the system 108 in terms of resource transaction data, integrity count, and is also assigned one or more protection keys (e.g., hash key(s)). In this way, the system 108 may create a metadata table in a graph database to hold information of one or more resource transactions in instances where data related to the resource transaction may exist on more than one of the application databases 110A, 110B, 110C.

Furthermore, the end-point devices 114A, 114B, 114C may be may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

In some embodiments, the system 108 may have a client-server relationship with various components in the computing environment 100, such as the data centers, data lakes, application databases, end-point devices, and/or servers, in which the system 108 receives a request from the components and subsequently provides service thereto. In some other embodiments, the system 108 may have a peer-to-peer relationship with the components in which the system 108 and the components are considered equal, and all have the same abilities to use the resources. Instead of having a central server (e.g., system 108) which would act as the shared drive, each component would act as the server for the files stored on it.

The system 108 may represent various forms of servers, such as web servers, database servers, file server, or the like, in various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

In some embodiments, the system 108 and the various components in the computing environment 100 may communicate using a network (not shown). The network may be a distributed network that is spread over different networks. This provides a single data communication network, which can be managed jointly or separately by each network. Besides shared communication within the network, the distributed network often also supports distributed processing. The network may be a form of digital communication network such as a telecommunication network, a local area network ("LAN"), a wide area network ("WAN"), a global area network ("GAN"), the Internet, or any combination of the foregoing. The network may be secure and/or unsecure and may also include wireless and/or wired and/or optical interconnection technology.

It is to be understood that the structure of the computing environment and its components, connections and relationships, and their functions, are meant to be exemplary only, and are not meant to limit implementations of the disclosures described and/or claimed in this document. In one example, the computing environment 100 may include more, fewer, or different components. In another example, some or all of the portions of the computing environment 100 may be combined into a single portion or all of the portions of the system 108 may be separated into two or more distinct portions.

FIG. 2 illustrates an exemplary component-level structure of the system 108, in accordance with an embodiment of the disclosure. As shown in FIG. 1B, the system 108 may include a processor 202, memory 204, input/output (I/O) device 216, and a storage device 210. The system 108 may also include a high-speed interface 208 connecting to the memory 204, and a low-speed interface 212 connecting to low speed bus 214 and storage device 210. Each of the components 202, 204, 208, 210, and 212 may be operatively coupled to one another using various buses and may be mounted on a common motherboard or in other manners as appropriate. As described herein, the processor 202 may include a number of subsystems to execute the portions of processes described herein. Each subsystem may be a self-contained component of a larger system (e.g., system 108) and capable of being configured to execute specialized processes as part of the larger system.

The processor 202 can process instructions, such as instructions of an application that may perform the functions disclosed herein. These instructions may be stored in the memory 204 (e.g., non-transitory storage device) or on the storage device 210, for execution within the system 108 using any subsystems described herein. It is to be understood that the system 108 may use, as appropriate, multiple processors, along with multiple memories, and/or I/O devices, to execute the processes described herein.

The memory 204 stores information within the system 108. In one implementation, the memory 204 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 204 is a non-volatile memory unit or units. The memory 204 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 204 may store, recall, receive, transmit, and/or access various files and/or information used by the system 108 during operation.

The storage device 210 is capable of providing mass storage for the system 108. In one aspect, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 204, the storage device 204, or memory on processor 202.

The high-speed interface 208 manages bandwidth-intensive operations for the system 108, while the low speed controller 212 manages lower bandwidth-intensive operations. Such allocation of functions is exemplary only. In some embodiments, the high-speed interface 208 is coupled to memory 204, input/output (I/O) device 216 (e.g., through a graphics processor or accelerator), and to high-speed expansion ports 111, which may accept various expansion cards (not shown). In such an implementation, low-speed controller 212 is coupled to storage device 210 and low-speed expansion port 214. The low-speed expansion port 214, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 108 may be implemented in a number of different forms. For example, the system 108 may be implemented as a standard server, or multiple times in a group of such servers. Additionally, the system 108 may also be implemented as part of a rack server system or a personal computer such as a laptop computer. Alternatively, components from system 108 may be combined with one or more other same or similar systems and an entire system 108 may be made up of multiple computing devices communicating with each other.

Various implementations of the distributed computing environment 100, including the system 108 and end-point device(s) 140, and techniques described here can be realized in digital electronic circuitry, integrated circuitry, specially designed ASICs (application specific integrated circuits), computer hardware, firmware, software, and/or combinations thereof.

FIG. 3 illustrates an exemplary data flow, in accordance with an embodiment of the disclosure. As shown in block 302, the system 108 may generate session metadata for each unique global session that is received via either streaming data or batch data of data sources 102. The session metadata 302 may include, but is not limited to, transaction history, an integrity counter, and a protective key (e.g., hash key) representing one or more unique metadata elements corresponding to specific data entry. It is understood that each unique global session identifier may coincide with data from multiple different upstream or downstream databases, as determined by the relation analyzer 310.

The relation analyzer 310 is tasked with determining which databases are affected by the data of each global data session and uses this information to build a knowledge graph relation database that shows the interrelation of databases and how data from each session is distributed across the entity system. For instance, the graph relation may include upstream database 304, comprising authentication data, resource deposit data, resource transfer data, resource payment data, or the like. The graph relation may include downstream database 306 comprising entity events data, claims data, settlements data, investigations data, or the like. It is understood that the system 108 may also contain a data reconciliation 308 for conducting data analytics, and such data may be stored in both structured and unstructured data formats, depending on each particular embodiment.

FIG. 4 illustrates a method for dynamic visual graph structure providing multi-stream data integrity and analysis, in accordance with an embodiment of the disclosure. As shown in block 402, the system 108 may receive global session data from a data source 102, in the form of either streaming data or batch data transfer. Data received by the system is stored in the data lake for further processing and determination. Once received, the system 108 may analyze the characteristics of the global session data and determine one or more impacted databases, as shown in block 404, using relation analyzer 310. It is understood that various characteristics of the data may be used to make this determination.

For instance, a data entry for global session ID 1 may include a disputed resource transfer. This data entry may correspond to multiple databases including a transfers database, an investigations database, a claims database, and an analytics database, such that the data may be used to make the initial transfer, support investigative efforts to determine if the transfer was malfeasant, update one or more users via a claims process, and provide further analytics support for the system 108 to make determinations about patterns or emerging patterns indicating malfeasant transfers in the future. Such data may be appended with a global session ID such as "GS00001" indicating global session 1, or "GS00000N", indicating global session of N number. It is understood that each global session may contain multiple data entries related to multiple different events, such as resource transfers, resource instrument access, account access, account to account transfers, addition of authorized account users, or the like. Each global session may correspond to a specific date, time or the like, such that each session or interaction with the system 108 may be identified.

As shown in block 406, the system may generate knowledge graph metadata for the global session data. It is understood that generating knowledge graph metadata may include assigning a global session reference identification (ID) number as discussed above, and in addition assigning a unique graph key, and an integrity counter, and as noted in block 408. It is further understood that generating knowledge graph metadata may include generating a unique hash value based on the global session reference number, the unique graph key, and the integrity counter, as shown in block 410. Finally, the received global session data may be stored in one or more upstream, downstream, or analytics databases, as noted in block 412.

Integrity of the data may be tracked using components of the system 108 including a specialized process for integrity tracking that assigns and inventories the integrity counter for each data entry. It is understood that the integrity counter may be represented as an integer value corresponding to the number of times a data entry is accessed, utilized, verifiably changed in an authorized manner, or the like. An integrity value of zero indicates that data may be purged from the system database(s). Any integrity counter above zero may prompt an integrity verification step wherein changes to the data entry may be authorized or denied. If data is determined to be impacted by an errant deletion request, unauthorized alteration, or the like, the system may execute an automatic request to rollback the data entry to a previous state based on the integrity counter value preceding the errant deletion request or the unauthorized change was executed. Data may be rolled back with the additional assistance of a change log which is updated each time a request to change or alter a data entry is executed.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for multi-stream data integrity and analysis, the system comprising:
   a processing device;
   a non-transitory storage device containing instructions when executed by the processing device, causes the processing device to perform steps of:
   receive global session data from a streaming or batch data source;
   based on one or more data characteristics of the global session data, determine one or more impacted databases;
   generate a knowledge graph metadata file for the global session data, wherein the knowledge graph metadata file comprises nodes representing data entries, relationships representing data dependencies, and one or more predictive analytics markers;

assign a global session reference number, a unique graph key, and an integrity counter to the metadata file, wherein the integrity counter triggers an automated rollback process upon detection of compromised data integrity;

generate a unique hash value based on the global session reference number, the unique graph key, and the integrity counter;

store data in one or more upstream, downstream, or analytics databases; and continuously and dynamically update the knowledge graph metadata file, in real-time, based on the global session data and the integrity counter, permitting the system to proactively identify and mitigate data integrity breaches prior to a propagation in the one or more upstream, downstream, or analytics databases.

2. The system of claim 1, further comprising splitting the global session data into multiple data entries stored in multiple databases.

3. The system of claim 2, wherein the multiple data entries are linked via a single global session identification number.

4. The system of claim 1, further comprising:
receive a purge request to delete one or more data entries of the global session data;
execute the purge request by updating a change log; and
verify integrity of the purge request.

5. The system of claim 4, wherein verifying the integrity of the purge request comprises:
accessing the knowledge graph metadata file for the global session data; and
determining if an integrity counter for the one or more data entries is greater than zero.

6. The system of claim 5, wherein the system is configured to rollback the purge request and restore the one or more data entries if the integrity counter for the one or more data entries is greater than zero.

7. The system of claim 5, wherein the system is configured to generate a request to verify validity of the one or more data entries if the integrity counter is greater than zero to determine if a rollback of data deletion is necessary.

8. A computer program product for multi-stream data integrity and analysis, the computer program product comprising a non-transitory computer-readable medium comprising code causing an apparatus to:
receive global session data from a streaming or batch data source;
based on one or more data characteristics of the global session data, determine one or more impacted databases;
generate a knowledge graph metadata file for the global session data, wherein the knowledge graph metadata file comprises nodes representing data entries, relationships representing data dependencies, and one or more predictive analytics markers;
assign a global session reference number, a unique graph key, and an integrity counter to the metadata file, wherein the integrity counter triggers an automated rollback process upon detection of compromised data integrity;
generate a unique hash value based on the global session reference number, the unique graph key, and the integrity counter;
store data in one or more upstream, downstream, or analytics databases; and
continuously and dynamically update the knowledge graph metadata file, in real-time, based on the global session data and the integrity counter, permitting the system to proactively identify and mitigate data integrity breaches prior to a propagation in the one or more upstream, downstream, or analytics databases.

9. The computer program product of claim 8, further comprising splitting the global session data into multiple data entries stored in multiple databases.

10. The computer program product of claim 9, wherein the multiple data entries are linked via a single global session identification number.

11. The computer program product of claim 8, further comprising:
receive a purge request to delete one or more data entries of the global session data;
execute the purge request by updating a change log; and
verify integrity of the purge request.

12. The computer program product of claim 11, wherein verifying the integrity of the purge request comprises:
accessing the knowledge graph metadata file for the global session data; and
determining if an integrity counter for the one or more data entries is greater than zero.

13. The computer program product of claim 12, wherein the system is configured to rollback the purge request and restore the one or more data entries if the integrity counter for the one or more data entries is greater than zero.

14. The computer program product of claim 12, wherein the system is configured to generate a request to verify validity of the one or more data entries if the integrity counter is greater than zero to determine if a rollback of data deletion is necessary.

15. A method for multi-stream data integrity and analysis, the method comprising:
receiving global session data from a streaming or batch data source;
based on one or more data characteristics of the global session data, determining one or more impacted databases;
generating a knowledge graph metadata file for the global session data, wherein the knowledge graph metadata file comprises nodes representing data entries, relationships representing data dependencies, and one or more predictive analytics markers;
assigning a global session reference number, a unique graph key, and an integrity counter to the metadata file, wherein the integrity counter triggers an automated rollback process upon detection of compromised data integrity;
generating a unique hash value based on the global session reference number, the unique graph key, and the integrity counter;
storing data in one or more upstream, downstream, or analytics databases; and
continuously and dynamically update the knowledge graph metadata file, in real-time, based on the global session data and the integrity counter, permitting the system to proactively identify and mitigate data integrity breaches prior to a propagation in the one or more upstream, downstream, or analytics databases.

16. The method of claim 15, further comprising splitting the global session data into multiple data entries stored in multiple databases.

17. The method of claim 16, wherein the multiple data entries are linked via a single global session identification number.

18. The method of claim 15, further comprising:
receive a purge request to delete one or more data entries of the global session data;

execute the purge request by updating a change log; and
verify integrity of the purge request.

19. The method of claim 18, wherein verifying the integrity of the purge request comprises:
- accessing the knowledge graph metadata file for the global session data; and
- determining if an integrity counter for the one or more data entries is greater than zero.

20. The method of claim 19, wherein the system is configured to rollback the purge request and restore the one or more data entries if the integrity counter for the one or more data entries is greater than zero.

* * * * *